Feb. 28, 1933. H. JUNKERS 1,899,038
METHOD OF AND APPARATUS FOR REGULATING THE FUEL
SUPPLY TO INTERNAL COMBUSTION ENGINES
Filed Nov. 2, 1929
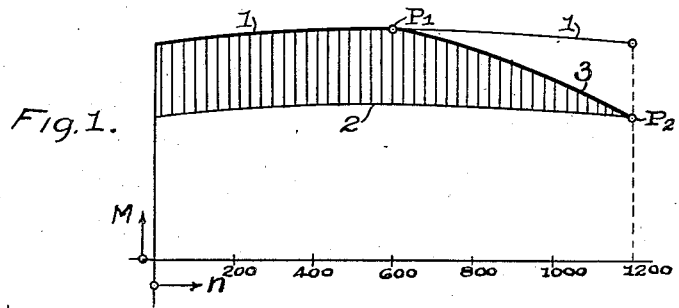
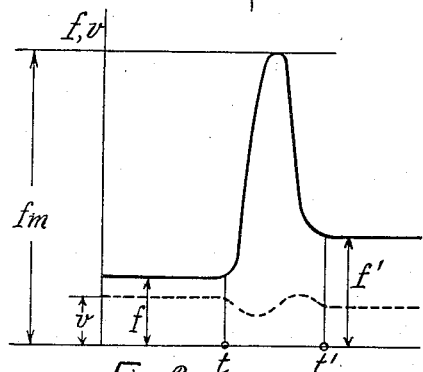
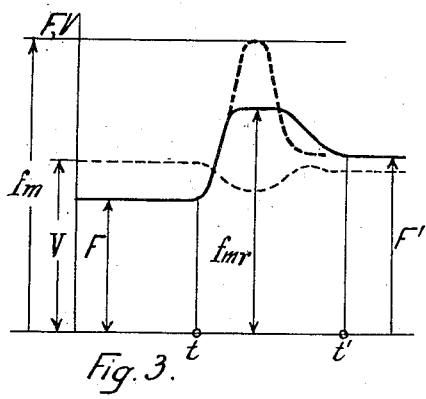
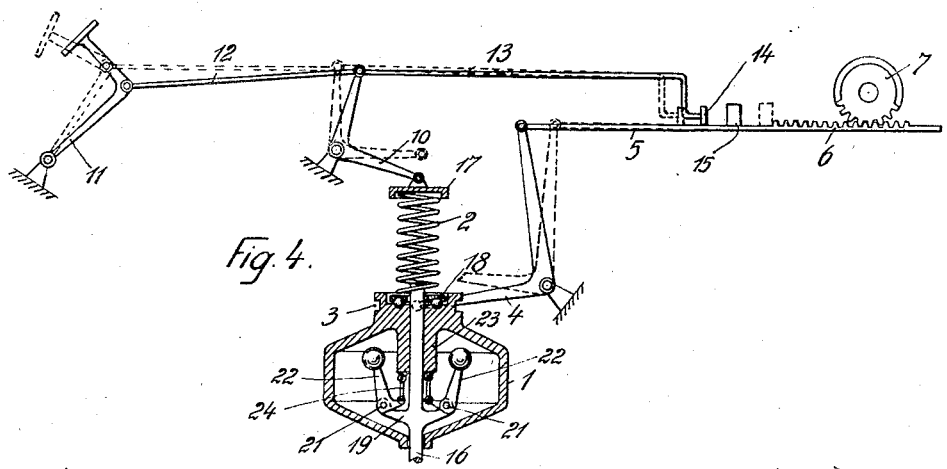
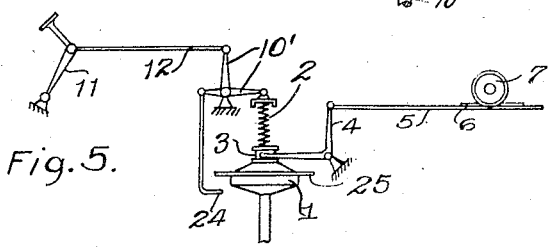
Inventor:
Hugo Junkers
by Karl Michaelis
Atty.

Patented Feb. 28, 1933

1,899,038

UNITED STATES PATENT OFFICE

HUGO JUNKERS, OF DESSAU, GERMANY

METHOD OF AND APPARATUS FOR REGULATING THE FUEL SUPPLY TO INTERNAL COMBUSTION ENGINES

Application filed November 2, 1929, Serial No. 404,393, and in Germany November 9, 1928.

My invention relates to method of, and apparatus for, regulating the fuel supply to internal combustion engines. My invention is particularly suitable for engines the speed of which varies within wide limits, for instance, motor car engines.

In such engines the power maximum as determined by the torque or mean effective pressure must be reduced as compared with the amount of the torque or mean effective pressures which are permitted at a medium speed, if the speed increases beyond this medium, as otherwise the stress on the engine might cause damage or failure.

Governors as designed heretofore have the drawback that, irrespective of the speed, they invariably supply the maximum amount of fuel upon an increase of the load. The consequence is that the fuel supply is either too large for the high-speed range, or too small for the low-speed range. If the maximum fuel supply for both speed ranges is calculated for the maximum load at the lower speed range, it is too large for the higher speed range, and the engine is subjected to excessive stress when the limit of the lower range is overstepped, while, on the other hand, if the maximum fuel supply is calculated for the maximum load at the higher speed range, it is too small for the lower range, the limit performance of the engine is unduly reduced at this range, and, besides, the regulation is unnecessarily delayed.

It is an object of my invention to eliminate the drawbacks of the old regulation so that the engine will operate at good efficiency under any load and at any speed, and will not be overstressed.

To this end I vary the fuel supply individually for the lower and for the higher speed range, and effect this variation while the conditions requiring regulation exist, that is, within the interval from the occurrence of abnormal to the re-establishment of normal conditions. The variation is effected in such manner that the maximum fuel supply at the higher range is less than the maximum at the lower range.

Means for reducing the fuel supply from a certain speed limit have already been suggested. This is effected by providing a throttling device in the suction pipe, or by making the suction pipe with an inside diameter which is smaller than that of a normal suction pipe. The suction increases with the speed and the throttling action increases also but is a function of the square of the speed. The consequence is that the throttling action only becomes effective at a speed which far exceeds the speed limit. Consequently, the speed is allowed to exceed the limit, and is then reduced. Obviously this system involves the same defect as the governor-controlled system previously referred to, that is, the amount of fuel is not only not adapted to the speed ranges, but is also regulated after, and not within, the above-said interval, in other words, the counteraction is only started after the high speed has been attained.

It is another object of my invention to provide apparatus for performing my method. To this end I provide an automatic speed regulator such as a centrifugal governor adapted to be operated by the engine, means operatively connected to the governor for regulating the fuel supply, means for adjusting the governor for different speeds during operation, and means operatively connected to the regulator-adjusting means for reducing the fuel supply to the engine at higher speed ranges.

In the drawing affixed to this specification and forming part thereof two governing systems for performing my invention are illustrated diagrammatically by way of example.

In the drawing

Fig. 1 is a diagram showing torque plotted against speed for illustrating the operation according to my method, Figs. 2 and 3 are diagrams showing fuel supply and speed plotted against time, and illustrating the fuel supply at the higher and at the lower speed range, respectively, Fig. 4 is a partly sectional side elevation of the first, and Fig. 5 a similar view of a second system.

Referring first to Fig. 1, the ordinate indicates the torque M, the abscissa the speed $n$. The slightly curved line 1 indicates the variation of the torque M as a function of the speed $n$, if the engine is regulated for the maximum fuel supply $fm$ (Figs. 2 and 3) at the lower speed range, and the line 2 indicates the variation if the fuel supply is regulated for the reduced maximum fuel supply $fmr$, Fig. 3, at the higher speed range. If the supply is regulated so as to obtain the torques indicated by line 1, the load will become too high from a given speed limit, say 600 revs. per min., corresponding to torque $P_1$. If the supply is regulated as indicated by line 2, the limit performance of the engine is unduly reduced at the lower speed range, since within this range the load might be increased for the difference of the torques plotted at 1 and at 2.

If the engine is regulated in accordance with my invention, the maximum fuel supply is reduced from the limit of the lower range, torque $P_1$, as shown by curve 3, until at the highest speed, 1,200 revs. per min., the torque $P_2$ is equal to that indicated by line 2 for the higher range.

Referring now to Fig. 2, $f$ is the fuel supply, and $v$ is the speed of the vehicle, say miles p. h., which are both plotted against time $t$. The dotted lines shows a speed $v$ of the vehicle which is within the lower range, that is, at or below the speed corresponding to 600 revs. per min. of the engine, as shown in Fig. 1. Assume that the resistance is constant and comparatively low until the time $t$ so that the small amount of fuel $f$ only is required for keeping up the low speed $v$. At the time $t$ the resistance is increased, for instance, the vehicle starts climbing a hill. The speed of the vehicle decreases immediately and the governor makes up for the loss by supplying to the engine the maximum amount of fuel $fm$. The vehicle is speeded up and then the fuel supply is reduced from $fm$ to $f'$ which is more than $f$ so that from the time $t'$ the vehicle will climb the hill at the former speed $v$ but with an increased supply of fuel.

Referring now to Fig. 3, $V$ is a speed within the higher range, and $F$ is the corresponding larger amount of fuel. At the time $t$ the resistance is increased, say, by a hill. If the engine were regulated in the normal manner, the maximum amount of fuel $fm$ would be supplied, as shown by the dotted line. According to my invention, however, the maximum fuel supply is reduced to $fmr$ by the governor, until at the time $t'$ the speed $V$ has been reestablished with the increased fuel supply $F'$ corresponding to the higher load, see heavy full line.

As a rule, the time interval from $t$ to $t'$ will be longer within the higher speed range, Fig. 3, since only the comparatively small amount of fuel $fmr-F'$ is available to make up for the reduction of speed at the beginning of the hill while at the lower speed range the larger amount $fm-f$ is available.

It will be understood that my regulation is distinguished from the normal regulation which only fixes a speed limit by cutting off the supply of fuel at that limit, in that it fixes two distinct maxima of fuel supply, an absolute maximum $fm$ for the lower range, and a "reduced" maximum $fmr$ for the higher range. The maxima are attained in both cases not only if the resistance increases to the maximum which the engine is able to overcome but already during the interval $t-t'$ during which the conditions requiring regulation exist. This includes the cases where the automatic regulating apparatus supplies the maximum amount of fuel only temporarily for acceleration.

In Figs. 4 and 5, two controlling devices adapted for carrying this regulating method into practice are illustrated. In both figures 1 is the governor of the engine to be regulated, this governor being driven by the engine at a constant ratio to the speed of the engine through the medium of a shaft 16. 2 is a spring which is held between a movable spring plate 17 and a ball bearing 18 in the governor casing, 19 is a bracket projecting from both sides of the shaft 16, 21, 21 are pivots at the ends of the bracket, and 22, 22 are weighted levers which are mounted to rock about the pivots 21 while their inner ends are connected to a sleeve 23 in the governor casing by links 24. 3 is the governor sleeve, and 4 is an angle lever operatively connected with the sleeve and transmitting the stroke of the sleeve to a rod 5.

This rod is here provided near its end with a rack 6 meshing with a pinion 7, which acts on the regulating member proper, for instance a throttle in the mixture suction conduit of a carbureter engine or a device for varying the effective stroke of a fuel pump in the case of a solid injection engine. For the purpose of adjusting the governor for different speeds the tension of spring 2 can be varied. This may be done by means of an angle lever 10, against one end of which the free end of the spring abuts by the plate 17 and which can be adjusted from a pedal lever 11 by means of a rod 12. With this end is connected another rod 13, the end of which carries the stop 14 faced by a check 15 on the rod 5. When the governor is adjusted for low speeds, as shown in full lines, the distance between the stop 14 and check 15 is such that the governor is entirely free to operate, so that with an increase of load it can adjust the regulating member for the highest possible supply of fuel $fm$ or $fmr$. However, if the spring 2 is further compressed, the rods 12, 13 being shifted to this end into the position shown in solid lines, the stop 14 will also be shifted towards the check 15 and in consequence thereof, when the load increases, the governor will not be able any more to displace the rod 5 and the regulating member governed by it for the highest possible supply of fuel, but only so far until the check 15 meets the stop 14. Obviously this limitation of the governor stroke will occur the sooner, the more lever 11 is displaced in the direction towards an increase of the speeds of the engine.

The arrangement shown in Fig. 5 is similar to the one above described, only the stop 14 is here replaced by a stop 24 at the end of a third arm of the angle lever 10' acting on the spring, while the check 15 is here replaced by a part, such as the projecting rim 25, which reciprocates together with the governor itself, this part cooperating with the stop 24 in such manner that, when the governor is adjusted for high speeds, the governor body can move downwardly only until it meets this stop. Here again I obtain that within the range of higher speeds the maximum quantity of fuel supplied will be less than within the range of smaller speeds.

The devices or systems illustrated in Figs. 4 and 5 are substantially similar to the regulating device for engines shown and described in my patent of the United States, No. 1,841,897 dated January 19, 1932, but in this patent I have shown a double-armed lever intermediate the rod which is connected to the lever 11 and the check and therefore the operation is reversed as compared with the operation of the present subject matter. As compared with the apparatus illustrated in Fig. 5, the device according to my said patent limits the stroke of the governor only at slow displacement of the system for regulating the speed of the governor, and particularly at low speed ranges, the object being to increase the speed smoothly and without jerks. Thus, while in the device according to my said prior patent the fuel supply is increased with increasing speed, in my present invention it is reduced for speed ranges beyond a certain medium speed.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. The method of regulating automatically the fuel supply to internal combustion engines in conformity with the speed of the engine comprising varying the fuel supply while the conditions requiring regulation exist by reducing the maximum fuel supply for speeds above a certain limit as compared with the maximum supply below such limit.

2. An apparatus for regulating the fuel supply to internal combustion engines comprising an automatic speed regulator adapted to be operated by the engine, means operatively connected to said regulator for regulating the fuel supply to the engine, means for adjusting the regulator for different speeds during operation, and means operatively connected to said regulator-adjusting means for reducing the fuel supply for higher speed ranges.

3. An apparatus for regulating the fuel supply to internal combustion engines comprising an automatic speed regulator adapted to be operated by the engine, means operatively connected to said regulator for regulating the fuel supply to the engine, means for adjusting the regulator for various speeds during operation, a stop operatively connected to said supply-regulating means, and a dog adapted to engage directly with said stop and so connected to said regulator-adjusting means that the distance between the stop and the dog is reduced when said adjusting means move in the direction corresponding to higher speed ranges.

In testimony whereof I affix my signature.

HUGO JUNKERS.